Patented Nov. 30, 1937

2,100,993

UNITED STATES PATENT OFFICE 2,100,993

PROCESS FOR PREPARING ESTERS AND PRODUCTS

Herman A. Bruson, Elkins Park, Pa., assignor to Röhm & Haas Company, Philadelphia, Pa.

No Drawing. Application December 14, 1934, Serial No. 757,456

16 Claims. (Cl. 260—2)

This invention pertains to a process for preparing esters of alpha-methacrylic acid with primary alcohols, more particularly with primary alcohols containing more than five carbon atoms.

The already known method for preparing esters of alpha-methacrylic acid such as the methyl or ethyl esters, consists in distilling a mixture of phosphorus pentoxide and the methyl or ethyl ester of alpha-hydroxy-isobutyric acid. This method, however, when applied to the higher esters of alpha-hydroxy-isobutyric acid and more particularly to those esters which contain long fatty chains in the alcohol radical, such as the lauryl, decyl, cetyl, oleyl or octadecyl esters of alpha-hydroxy-isobutyric acid, gives products which are of poor quality for purposes of polymerization, due to excessive decomposition and cracking induced by the $P_2O_5$ at the high temperatures necessary for distilling off the alpha-methacrylates even under high vacuum. Furthermore, during the distillation, a solid mass of meta-phosphoric acid separates which prevents the proper flow of heat to the still bottom. This solid mass fuses to the sides of the still and not only acts as a catalyst for decomposing the desired product, but also mechanically coats over the phosphorus pentoxide and renders it unfit for dehydration. This results in low yields and poor heat economy. The products are always contaminated with decomposition products which are deleterious.

According to the present invention, all of these difficulties are eliminated and high yields of the higher esters of alpha-methacrylic acid obtained, which are of excellent purity by carrying out the dehydration in an organic volatile liquid which is non-hygroscopic and inert towards phosphoric acid, phosphorus pentoxide and the esters concerned. The organic liquid should preferably boil below 200° C. at ordinary pressure. Suitable liquids are the aliphatic, aromatic, or hydroaromatic preferably saturated hydrocarbons or their chloro derivatives such as benzene, toluene, xylene, solvent naphtha, chlorobenzene, petroleum naphtha, ethylene dichloride, carbon tetrachloride, cyclohexane, octane, and the like.

I have found that the quantity of phosphorus pentoxide used also materially affects the purity of the product. An excess of $P_2O_5$ promotes decomposition whereas if not enough $P_2O_5$ is employed considerable undehydrated hydroxyisobutyric acid ester distils over. For practical purposes the quantity of $P_2O_5$ used as an upper limit should not exceed one mol., and as a lower limit should not be less than $\frac{1}{12}$ mol. $P_2O_5$ per mol. of the hydroxyisobutyric acid ester used. It is advantageous to use about 0.33 mol. $P_2O_5$ per mol. of hydroxyisobutyrate. The dehydration step is carried out with agitation at a moderate temperature (25–120° C.) until the $P_2O_5$ has practically completely dissolved in the mixture of solvent and ester used. Any undissolved particles are then filtered off and the clear filtrate distilled to recover the solvent and to fractionate in vacuo the alpha-ethacrylic ester in pure form. Under these conditions no solid mass separates during the distillation, the still residue being very fluid even at the end of the distillation; thus insuring a high yield of high quality product capable of being readily polymerized.

The following examples are given by way of illustrating this process:—

*Example 1.*—In a vessel fitted with a stirrer, reflux condenser and dropping funnel, there was placed 30 grams of phosphorus pentoxide and 200 grams of dry toluene. This suspension was stirred and a solution of 150 grams cetyl-alpha-hydroxyisobutyrate in 100 grams dry toluene, allowed to drip in slowly during the course of about one hour. No external cooling was required, the temperature remaining at 30–35° C. The mixture was then stirred for two hours at room temperature (25° C.) during which time most of the $P_2O_5$ dissolved. The solution was then warmed in the course of one hour to 80° C. while stirring. It was then cooled to 25° C. and a small amount of insoluble material filtered off. The clear filtrate was transferred to a still and the toluene distilled off under ordinary pressure. It is advantageous to add 0.1% of hydroquinone or alpha-naphthol to prevent polymerization of the material in the still. High vacuum was then applied and the cetyl-alpha-methacrylate boiling within the range 170–212° C./5 mm. collected. The yield was 85% of the theoretical of a product which was colorless, free from acidity, free from cetene, and of excellent polymerizing qualities. When heated with 0.2% by weight of benzoyl peroxide at 75° C. it polymerizes within 12 hours to a colorless rubbery mass, whereas a sample of cetyl-alpha-methacrylate made by dry vacuum distillation of the same amounts of $P_2O_5$ and cetyl-hydroxyisobutyrate does not polymerize within 60 hours and often does not polymerize at all, due to the presence therein of acidic and olefinic decomposition products.

In place of toluene, the same volume of benzene, ethylene dichloride, solvent naphtha or any of the other suitable solvents mentioned herein can be used.

Example 2.—One-third mol. equivalent of phosphorus pentoxide was suspended in about five times its weight of ethylene dichloride, and mixed with one mol. equivalent of lauryl-alpha-hydroxyisobutyrate dissolved in its own weight of ethylene dichloride. After heating for 1 hour to the boiling point of the solvent, as described in Example 1, the clear solution obtained was distilled. After the ethylene dichloride came over the lauryl-alpha-methacrylate distilled as a colorless oil in 85% yield, the main fraction of which boiled at 145-165° C./5 mm. It polymerized readily when heated at 80° C. with 0.2% of benzoyl peroxide, to a colorless rubbery mass. Benzene or toluene can be substituted for the ethylene dichloride.

Example 3.—One-half mol. equivalent of P₂O₅ suspended in four times its weight of benzene was agitated with a 1:1 benzene solution of stearyl-alpha-hydroxyisobutyrate at 25–30° C. for 3 hours and the mixture finally heated during 1 hour to 75° C. The clear solution obtained was then distilled. The n-octadecyl-alpha-methacrylate came over in 87% yield at 190–210° C./5 mm. It readily polymerizes to a colorless rubbery mass when heated 12 hours at 75° C. in the presence of 0.2% benzoyl peroxide.

In the same manner the following esters were prepared. They all polymerize extremely readily to colorless rubbery masses.

n-hexyl-alpha-methacrylate, b. p. 95–109° C./35 mm., n-octyl-alpha-methacrylate, b. p. 110–120° C./10 mm., alpha-ethylhexyl-alpha-methacrylate b. p. 136–147° C./75 mm. and phenylethyl - alpha - methacrylate b. p. 100–120° C./2 mm.

Esters containing more or less than 5 carbon atoms in the alcohol radical, other than those mentioned can be prepared in accordance with this invention, the above examples being given merely by way of illustration and not limitation. Among these are the heptyl, chloro ethyl and benzyl esters of alpha-methacrylic acid.

Although I have described the preferred manner of practicing this invention, modifications in the procedure can be made without departing from its spirit, by using temperatures or proportions different from those shown in the examples. Other non-polar solvents which are inert toward the reacting components can also be used such as tetrachlorethane, o-dichlorbenzene, petroleum ether (boiling range 90–100° C.), and trichlorethane.

The polymers obtained from the above esters having more than five carbon atoms in the alcohol radical are very pure viscous materials and constitute new compounds which are useful in lubricating oils, laminated glass, adhesives, rubber compositions, and coating compositions.

I claim:—

1. A process for making esters of alpha-methacrylic acid and primary monohydric alcohols containing more than five carbon atoms, which comprises reacting the corresponding ester of alpha-hydroxyisobutyric acid with from 1/12 to 1 mol. equivalent of phosphorus pentoxide in the presence of a volatile organic liquid which is inert towards the reactants; filtering off any solid material, and distilling the resulting solution.

2. A process for making esters of alpha-methacrylic acid and primary monohydric alcohols containing more than five carbon atoms which comprises reacting the corresponding ester of alpha-hydroxyisobutyric acid with phosphorus pentoxide in a solvent which is one of the group consisting of volatile, liquid, hydrocarbons and chlorinated hydrocarbons; removing any insoluble matter and distilling the clear solution obtained.

3. A process for making esters of alpha-methacrylic acid and primary monohydric alcohols containing more than five carbon atoms which comprises reacting the corresponding ester of alpha-hydroxyisobutyric acid with reacting proportions of phosphorus pentoxide in dry toluene; filtering off any insoluble matter, and fractionating the clear solution.

4. A process for making esters of alpha-methacrylic acid and primary monohydric alcohols containing more than five carbon atoms which comprises reacting the corresponding ester of alpha-hydroxyisobutyric acid with reacting proportions of phosphorus pentoxide in dry ethylene dichloride, filtering off any insoluble matter, and fractionating the clear solution.

5. A process for making lauryl-alpha-methacrylate which comprises reacting lauryl-alpha-hydroxyisobutyrate and phosphorus pentoxide in a volatile inert organic liquid, filtering off any insoluble matter, and fractionating the solution obtained.

6. A process for making cetyl-alpha-methacrylate which comprises reacting cetyl-alpha-hydroxyisobutyrate and phosphorus pentoxide in a volatile inert organic liquid, filtering off any insoluble matter, and fractionating the solution obtained.

7. A process for making n-octadecyl-alpha-methacrylate which comprises reacting n-octadecyl-alpha-hydroxyisobutyrate and phosphorus pentoxide in a volatile inert organic liquid, filtering off any insoluble matter, and fractionating the solution obtained.

8. A methacrylic acid ester of an aliphatic monohydric saturated normal primary alcohol containing from 8 to 18 carbon atoms in the alcohol radical.

9. Lauryl methacrylate.
10. Stearyl methacrylate.
11. Polymeric lauryl methacrylate.
12. Polymeric stearyl methacrylate.
13. Cetyl methacrylate.
14. Polymeric cetyl methacrylate.
15. A polymeric methacrylic acid ester of an aliphatic monohydric saturated normal primary alcohol containing from eight to eighteen carbon atoms in the alcohol radical.

16. A process for making esters of α-methacrylic acid and primary monohydric alcohols containing more than five carbon atoms which comprises reacting the corresponding ester of α-hydroxyisobutyric acid with from one-twelfth to one mol. equivalent of phosphorus pentoxide in the presence of a volatile organic solvent which is inert toward the reactants and has a boiling point at atmospheric pressure below 200° C. filtering off any solid material and distilling the resulting solution.

HERMAN A. BRUSON.